US010637717B2

(12) United States Patent
Gandhi et al.

(10) Patent No.: US 10,637,717 B2
(45) Date of Patent: Apr. 28, 2020

(54) FAULT RESILIENT VIRTUAL BROADBAND GATEWAY

(71) Applicant: A10 Networks, Inc., San Jose, CA (US)

(72) Inventors: Nishant Gandhi, Sunnyvale, CA (US); Ronald Wai Lun Szeto, San Francisco, CA (US)

(73) Assignee: A10 Networks, Inc., San Jose, CA (US)

( * ) Notice: Subject to any disclaimer, the term of this patent is extended or adjusted under 35 U.S.C. 154(b) by 32 days.

(21) Appl. No.: 15/470,807

(22) Filed: Mar. 27, 2017

(65) Prior Publication Data

US 2018/0278469 A1   Sep. 27, 2018

(51) Int. Cl.
*H04L 12/24* (2006.01)
*H04L 12/28* (2006.01)

(52) U.S. Cl.
CPC ...... *H04L 41/0668* (2013.01); *H04L 12/2869* (2013.01); *H04L 12/2898* (2013.01); *H04L 41/0893* (2013.01)

(58) Field of Classification Search
None
See application file for complete search history.

(56) References Cited

U.S. PATENT DOCUMENTS

2017/0244593 A1*   8/2017   Rangasamy ........ H04L 41/0654

\* cited by examiner

*Primary Examiner* — Christopher M Crutchfield
*Assistant Examiner* — Alan L Lindenbaum
(74) *Attorney, Agent, or Firm* — Keith Kline; The Kline Law Firm PC

(57) ABSTRACT

Provided are methods and systems for providing a fault resilient virtual broadband gateway. A fault resilient virtual broadband gateway system may include a primary network node, at least one secondary node, and a controller. The primary network node may establish a first data traffic channel with customer premises equipment. The primary network node may collect customer policy data of the customer premises equipment and continuously provide the collected customer policy data to the controller. The at least one secondary network node may determine that the primary network node is no longer available to serve the customer premises equipment and may establish a second data traffic channel with the customer premises equipment. The at least one secondary network node may receive, on demand, the customer policy data from the controller. The at least one secondary network node may serve the customer premises equipment based on the received customer policy data.

11 Claims, 11 Drawing Sheets

FAULT RESILIENT VIRTUAL BROADBAND GATEWAY

TECHNICAL FIELD

This invention relates generally to data networks and more particularly to a fault resilient virtual broadband gateway.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Reliability of Internet access is essential to the ability of households and businesses to manage personal matters and conduct business. A home network of a private customer and a private network of a business enterprise can be connected to the Internet using customer premises equipment, such as routers, modems, switches, and the like. Conventional customer premises equipment collects and stores network-related data, such as settings of the customer premises equipment, setting of electronic devices connected to the Internet using the customer premises equipment, or policies for accessing the Internet by the electronic devices. If the customer premises equipment fails or is replaced with new customer premises equipment, all network-related data stored by the customer premises equipment may be lost and a set-up of the new customer premises equipment may be needed. The customer may need to manually provide settings for the new customer premises equipment.

It may be possible for configurations settings associated with customer premises equipment to be stored remotely, for example, on a cloud-based remote storage resource. For example, a virtual servicing node may be in communication with the customer premises equipment and responsible for collecting and storing the network-related data. However, conventional virtual servicing nodes serving the customer premises equipment are not fault tolerant. In case of a failure of the virtual servicing node, the customer premises equipment may lose access to the network-related data and the data connection of the customer network may be interrupted. Thus, failure of a virtual servicing node fail may result in thousands of customers losing data access.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to approaches for providing a fault resilient virtual broadband gateway. According to one approach of the present disclosure, a fault resilient virtual broadband gateway system is provided. The fault resilient virtual broadband gateway system may include a controller, a primary network node, and at least one secondary node. The controller may be operable to continuously store customer policy data associated with customer premises equipment. The primary network node may establish a first data traffic channel with the customer premises equipment. In a course of data communications with the customer premises equipment, the primary network node may collect, via the first data traffic channel, customer policy data associated with the customer premises equipment. The primary network node may continuously provide the collected customer policy data to the controller. The at least one secondary network node may determine that the primary network node is no longer available to serve the customer premises equipment. Based on the determination, the at least one secondary network node may establish a second data traffic channel with the customer premises equipment to receive the data communications. The at least one secondary network node may receive, on demand, the customer policy data from the controller. The at least one secondary network node may serve the customer premises equipment based on the customer policy data received from the controller. The customer premises equipment may be served via the second data traffic channel. Therefore, a seamless failover between the primary network node and the at least one secondary network node may be provided.

According to another approach of the present disclosure, a method for providing a fault resilient virtual broadband gateway is provided. The method may commence with establishing, by a primary network node, a first data traffic channel with customer premises equipment. The method may continue with collecting customer policy data associated with the customer premises equipment by the primary network node. The customer policy data associated with the customer premises equipment collection may be collected in a course of data communications with the customer premises equipment via the first data traffic channel. The collected customer policy data may be continuously provided to a controller by the primary network node. The method may further include determination, by at least one secondary network node, that the primary network node is no longer available to serve the customer premises equipment. The method may further include establishing, by the at least one secondary network node, a second data traffic channel with the customer premises equipment for receiving the data communications. The method may continue with receiving, on demand, the customer policy data by the at least one secondary network node from the controller. The method may further include serving the customer premises equipment based on the customer policy data received from the controller. The customer premises equipment may be served by the at least one secondary network node. The customer premises equipment may be served via the second data traffic channel. Therefore, a seamless failover between the primary network node and the at least one secondary network node may be provided.

In further example embodiments of the present disclosure, the method operations are stored on a machine-readable medium comprising instructions, which, when implemented by one or more processors, perform the recited operations. In yet further example embodiments, hardware systems or devices can be adapted to perform the recited operations. Other features, examples, and embodiments are described below.

BRIEF DESCRIPTION OF THE DRAWINGS

Embodiments are illustrated by way of example, and not by limitation, in the figures of the accompanying drawings, in which like references indicate similar elements.

DETAILED DESCRIPTION

Figure 1:
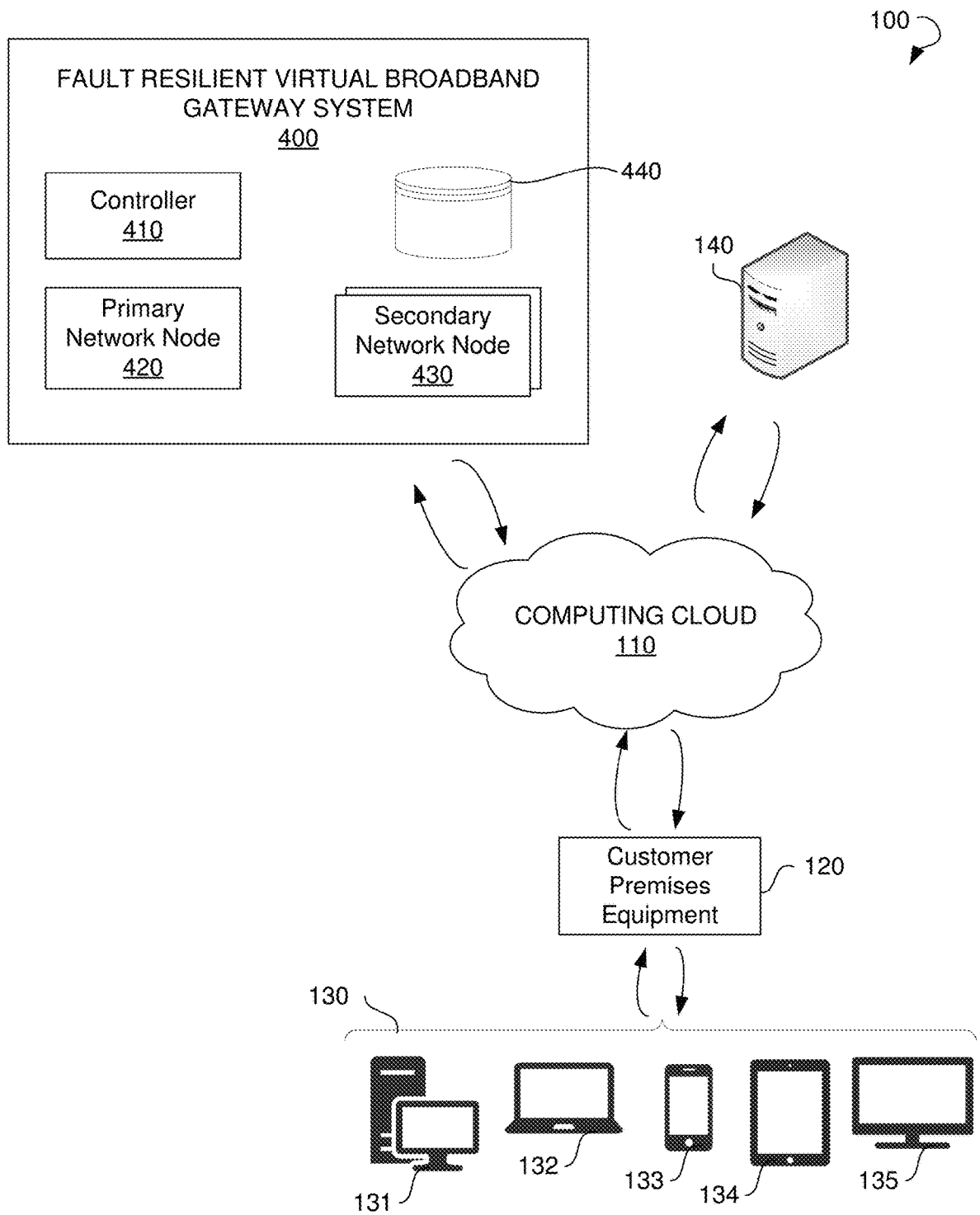
FIG. 1 shows an environment, within which methods and systems for providing a fault resilient virtual broadband gateway can be implemented.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits, programmable logic devices, or various combinations thereof. In particular, the methods described herein may be implemented by a series of computer-executable instructions residing on a storage medium, such as a disk drive or computer-readable medium. It should be noted that methods disclosed herein can be implemented by a computer (e.g., a desktop computer, a tablet computer, a laptop computer), a game console, a handheld gaming device, a cellular phone, a smart phone, a smart television system, and so forth.

As outlined in the summary, the embodiments of the present disclosure are directed to providing a fault resilient virtual broadband gateway. A customer may have a number of electronic devices, also referred to as customer devices, such as personal computers (PCs), tablets, smartphones, and the like, on customer premises. Each of the electronic devices may be connected to a data network, such as the Internet, using customer premises equipment. The customer premises equipment, also referred herein to as network equipment or computer networking devices, may include physical devices that are responsible for providing communication and interaction between the electronic devices and the data network. The customer premises equipment of the customer may be connected to a fault resilient virtual broadband gateway system. The fault resilient virtual broadband gateway system may include a controller and a plurality of network nodes, also referred to as virtual broadband gateways, gateways, or servicing nodes. The network nodes may include virtual network nodes and may reside, for example, in a cloud network. The network nodes may be responsible for serving data traffic going between the customer premises equipment and servers in the data network. The customer premises equipment may be aware of the presence of the plurality of network nodes in the data network. More specifically, the customer premises equipment may be preconfigured to have network addresses of the network nodes in the data network.

When the customer premises equipment connects to the data network, one of the network nodes, e.g., a primary network node, may be assigned by the fault resilient virtual broadband gateway system to serve the data traffic between the customer premises equipment and the servers. In the course of communication with the customer premises equipment, the primary network node may collect customer policy data associated with the customer premises equipment. The customer policy data may include Internet Protocol (IP) addresses, Media Access Control (MAC) addresses, configuration parameters of the customer premises equipment, configuration parameters of the customer devices connected to the customer premises equipment, and so forth. The primary network node may dynamically provide the collected customer policy data to the controller. The controller may include a database to consistently store the customer policy data collected by the primary network node.

Network nodes may become disabled; for example, the network nodes may become unavailable to serve data traffic. When the primary network node does not response to requests of the customer premises equipment, the customer premises equipment may determine that the primary network node failed. Because the customer premises equipment is aware of network addresses of other network nodes in the data network, the customer premises equipment may select one of the other network nodes, such as a secondary network node, to serve the data traffic of the customer premises equipment.

Upon receipt of the data traffic from the customer premises equipment, the secondary network node may determine that the primary network node is no longer available. To serve the data traffic of the customer premises equipment, the secondary network node needs to have all customer policy data related to the customer premises equipment. Therefore, upon receipt of the data traffic from the customer premises equipment, the secondary network node may send a request to the controller to receive the customer policy data. In response to the request, the controller may access the requested customer policy data in the database and send the requested customer policy data to the secondary network node.

Upon receipt of the customer policy data, the secondary network node may continue serving the data traffic of the customer premises equipment based on the customer policy data. Furthermore, the secondary network node may continue to collect customer policy data of the customer premises equipment and provide the collected customer policy data to the controller. Therefore, even in case of failure of the secondary network node, a tertiary network node may continue serving the data traffic of the customer premises equipment based on the customer policy data collected by the primary network node and the secondary network node. Therefore, the fault resilient virtual broadband gateway system may provide a seamless failover between the network nodes that serve the data traffic of the customer premises equipment. The failover between the network nodes may be more stateless as there is no need for the customer policy data to be sent across the data network.

Referring now to the drawings, FIG. 1 illustrates an environment 100 within which methods and systems for providing a fault resilient virtual broadband gateway can be implemented. The environment 100 may include a data network, such as a computing cloud 110, customer premises equipment 120, customer devices 130, a server 140, and a fault resilient virtual broadband gateway system 400 (also referred to as a system 400). The customer devices 130 may include a PC 131, a laptop 132, a smartphone 133, a tablet PC 134, a television set 135, and so forth. The customer devices 130 may be connected to the customer premises equipment 120 to have access to the computing cloud 110.

The data network may be not limited to a computing cloud 110 but may include the Internet or any other network capable of communicating data between devices. Suitable networks may include or interface with any one or more of, for instance, a local intranet, a Personal Area Network (PAN), a Local Area Network (LAN), a Wide Area Network, a Metropolitan Area Network, a virtual private network (VPN), a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The data network can further include or interface with any one or more of an RS-232 serial connection, an IEEE-1394 (FireWire) connection, a Fiber Channel connection, an IrDA (infrared) port, a Small Computer Systems Interface connection, a Universal Serial Bus (USB) connection or other wired or wireless, digital or analog interface or connection, mesh or Digi® networking. The data network may include a network of data processing nodes, also referred to as network nodes that are interconnected for the purpose of data communication.

The system 400 may include a controller 410, a primary network node 420, a secondary network node 430, and a database 440. The primary network node 420 and the secondary network node 430 may be configured to serve data traffic going between the customer premises equipment 120 and the server 140. The system 400 may be responsible for a seamless failover between the primary network node 420 and the secondary network node 430 in case of a failure of the primary network node 420.

Figure 2:
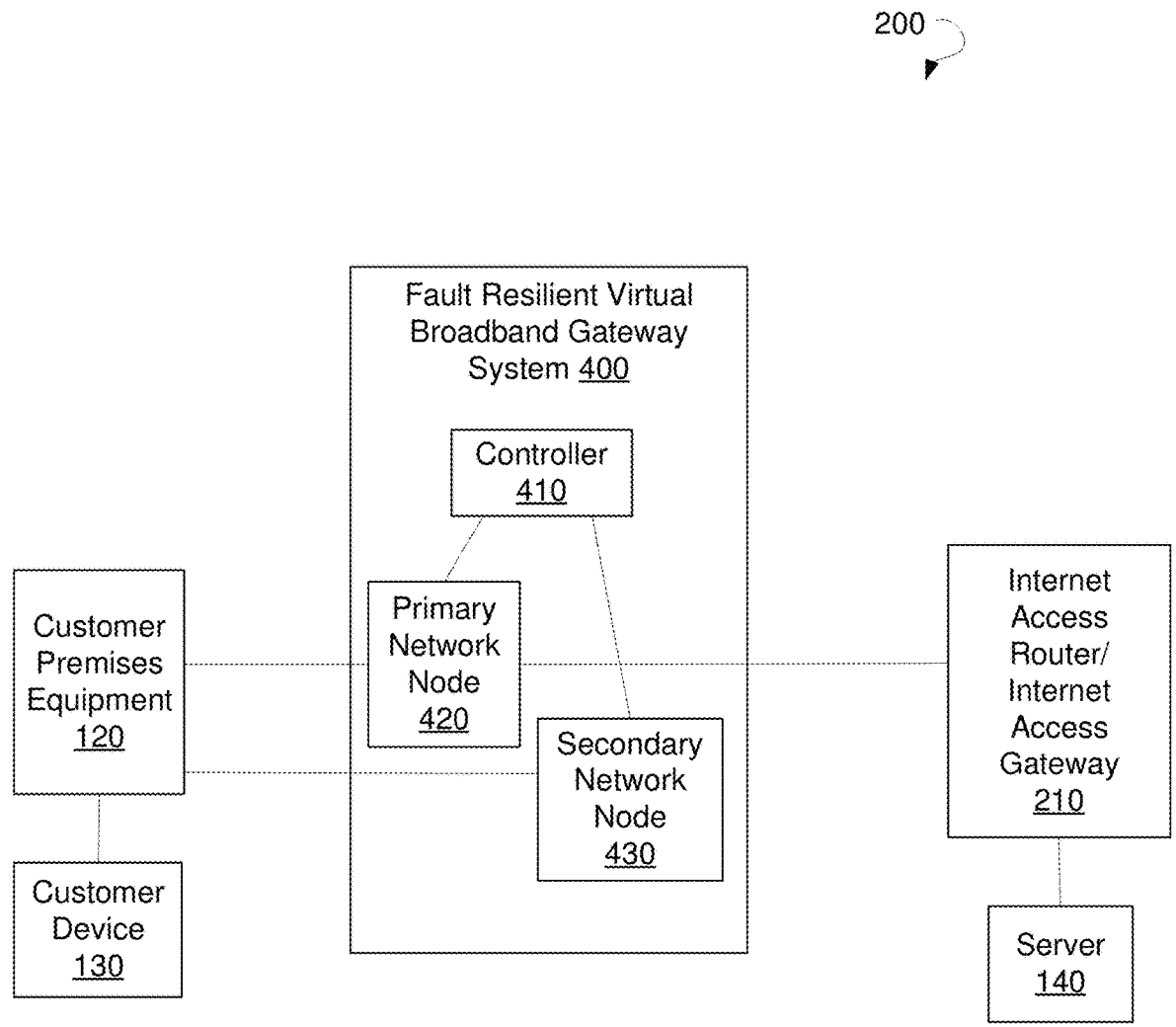
FIG. 2 is a schematic diagram showing a communication between a customer device and a server via a fault resilient virtual broadband gateway system.

FIG. 2 is a block diagram 200 showing a communication between a customer device and a server via a fault resilient virtual broadband gateway system, according to an example embodiment. A customer device 130, such as a smartphone, a laptop, or a PC on customer premises, may access a data network via customer premises equipment 120, such as a router or a switch. Data traffic may be transferred between the customer device 130 and a server 140 in a data network (not shown) using a fault resilient virtual broadband gateway system 400. The server 140 may have an Internet access router/Internet access gateway 210 for connecting to the data network. The customer premises equipment 120 may be connected to the system 400. More specifically, the customer premises equipment 120 may have data related to network addresses of a plurality of servicing nodes of the system 400, such as a primary network node 420 and a secondary network node 430. The customer premises equipment 120 may be in communication with one of the servicing nodes of the system 400 (for example, the primary network node 420). The primary network node 420 may receive data traffic from the customer premises equipment 120 and send the data traffic to the Internet access router/Internet access gateway 210 so that the data traffic can be provided to the server 140. Similarly, the primary network node 420 may receive data traffic sent by the Internet access router/Internet access gateway 210 of the server 140 and direct the data traffic to the customer premises equipment 120. When serving the data traffic between the customer premises equipment 120 and the Internet access router/Internet access gateway 210, the primary network node 420 may collect customer policy data related to the customer premises equipment 120. The collected customer policy data may be provided to a controller 410 for storing in a database (not shown).

Upon a failure of the primary network node 420, the customer premises equipment 120 may start to send the data traffic to the secondary network node 430. The secondary network node 430 may request the controller 410 to provide the customer policy data. Upon receipt of the customer policy data from the controller 410, the secondary network node 430 may continue serving the data traffic between the customer premises equipment 120 and the Internet access router/Internet access gateway 210 based on the customer policy data.

Figure 3:
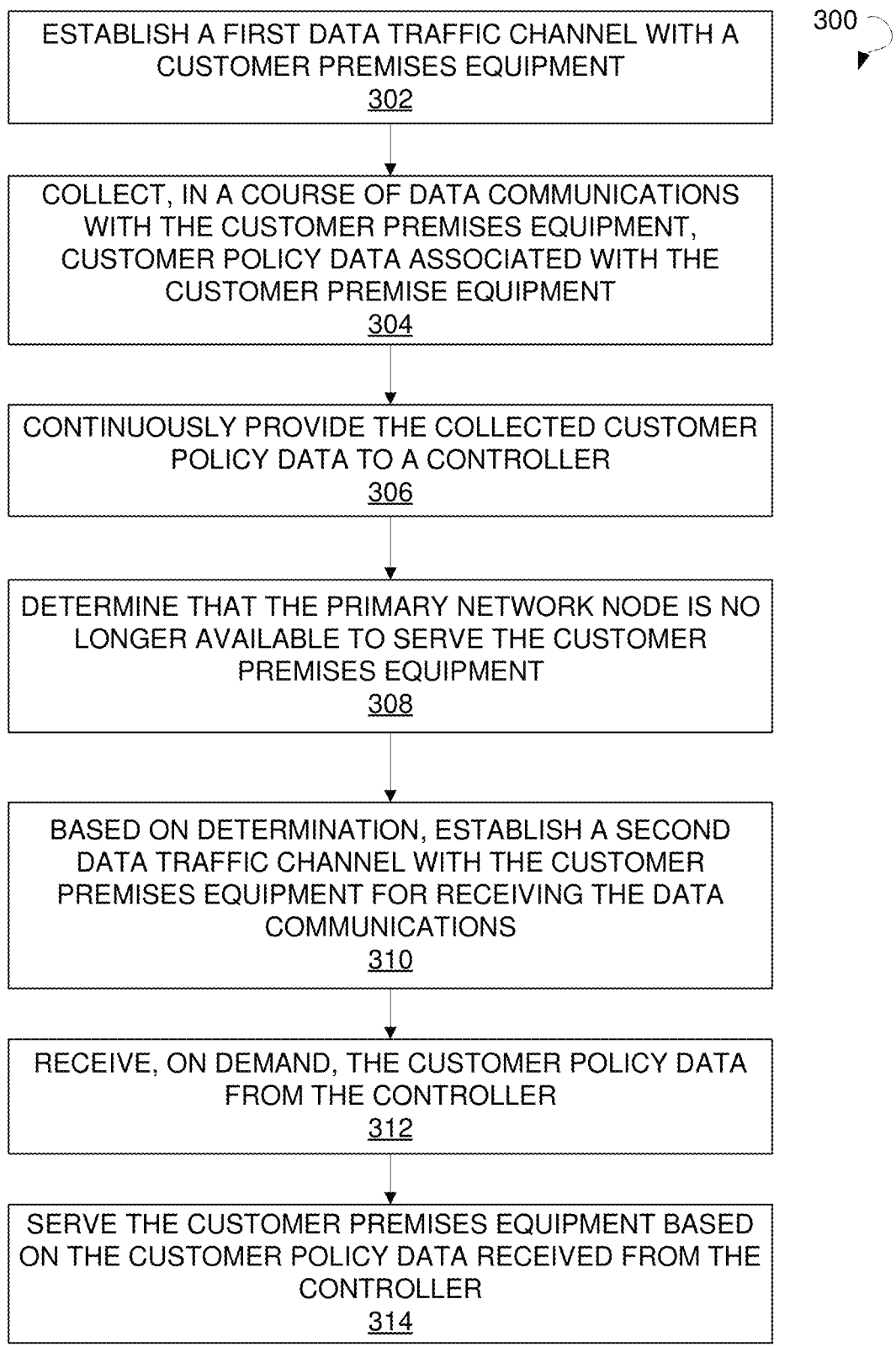
FIG. 3 is a flow diagram illustrating a method for providing a fault resilient virtual broadband gateway.

FIG. 3 shows a process flow diagram of a method 300 for providing a fault resilient virtual broadband gateway, according to an example embodiment. In some embodiments, the operations may be combined, performed in parallel, or performed in a different order. The method 300 may also include additional or fewer operations than those illustrated. The method 300 may be performed by processing logic that may comprise hardware (e.g., decision making logic, dedicated logic, programmable logic, and microcode), software (such as software run on a general-purpose computer system or a dedicated machine), or a combination of both.

The method 300 may commence with establishing, by a primary network node, a first data traffic channel with a customer premises equipment at operation 302. In an example embodiment, the customer premises equipment may include at least one of the following: a modem, a router, a network switch, a wireless access point device, a gateway device, a network bridge, a hub, a repeater, and so forth. In a further example embodiment, the customer premises equipment may be connected to at least one customer device. The at least one customer device may be located on customer premises and may include at least one of the following: a laptop, a smartphone, a smartwatch, a PC, a tablet computer, a television set, a set-top box, and the like.

The method 300 may continue with collecting, by the primary network node, customer policy data associated with the customer premises equipment at operation 304. More specifically, the primary network node may collect the customer policy data in a course of data communications with the customer premises equipment via the first data traffic channel. In an example embodiment, the customer policy data may include at least one of the following: an IP address, a MAC address, configuration parameters associated with the customer premises equipment, configuration parameters associated with the at least one customer device connected to the customer premises equipment, a customer account, policies applied to the at least one customer device, a bandwidth associated with the at least one customer device, authorization data associated with the at least one customer device, privileges associated with the at least one customer device, passwords associated with the customer premises equipment, security information associated with the customer premises equipment, network settings associated with the customer premises equipment, and so forth.

The primary network node may continuously provide the collected customer policy data to a controller at operation 306. The method 300 may further include operation 308, at which at least one secondary network node may determine that the primary network node is no longer available to serve the customer premises equipment. In an example embodiment, the customer premises equipment may be preconfigured to determine that the primary network node is unavailable. Based on the determination that the primary network node is unavailable, the customer premises equipment may direct the data traffic associated with the customer premises equipment to the at least one secondary network node. Therefore, based on the receipt of the data traffic from the customer premises equipment, the at least one secondary network node may determine that the primary network node is no longer available.

Based on the determination that the primary network node is no longer available, the at least one secondary network node may establish a second data traffic channel with the customer premises equipment at operation 310. The second data traffic channel may be used by the at least one secondary network node for receiving the data communications from the customer premises equipment and sending the data communications to the customer premises equipment.

Upon establishing the second data traffic channel, the at least one secondary network node may receive, on demand, the customer policy data from the controller at operation 312. More specifically, the at least one secondary network node may request the controller to provide the customer policy data.

The method 300 may include serving, by the at least one secondary network node, the customer premises equipment via the second data traffic channel at operation 314. The customer premises equipment may be served based on the customer policy data received from the controller. Thus, a seamless failover between the primary network node and the at least one secondary network node may be provided.

In an example embodiment, the customer policy data may be segregated into control data and session data. The control data may be associated with the customer premises equipment and include, for example, the IP address, the MAC address, the configuration parameters associated with the customer premises equipment, the configuration parameters associated with the at least one customer device connected to the customer premises equipment, and so forth. The session data may be associated with a data session in which the data communications are received by the primary network node via the first data traffic channel. The control data may be continuously provided to the controller. The session data may be continuously provided to the at least one secondary network node. Based on synchronization of the control data with the controller and the session data with the at least one secondary network node, the at least one secondary network node may request that the controller provide the control data and continue forwarding (when the primary network node becomes unavailable) the data communications based on the session data synchronized with the at least one secondary network node. Therefore, such a seamless failover between the primary network node and the at least one secondary network node may result in providing smooth customer experience.

In some example embodiments, each of the primary network node and the at least one secondary network node may be associated with a web portal. The web portal may be accessible by a customer associated with the customer premises equipment to enable the customer to log into the customer account associated with the web portal. When being logged into the customer account on the web portal, the customer may manage at least one of the following: the customer policy data associated with the customer premises equipment, configuration parameters associated with at least one customer device connected to the customer premises equipment, the customer account, and so forth. The method 300 may further include collecting, by the controller, data provided by the customer via the web portal.

In an example embodiment, the primary network node and the at least one secondary network node may be operable to serve a plurality of customer service equipment associated with a plurality of customers at a plurality of locations. In other words, the customer service equipment of many customers may be served by the primary network node and the at least one secondary network node.

In a further example embodiment, the number of network nodes may not be limited to the primary network node and the at least one secondary network node, but may include a plurality of further network nodes. The customer premises equipment may be preconfigured to determine presence of the primary network node, the at least one secondary network node, and any further network nodes in a data network. In case of a failure of one of the network nodes, the customer premises equipment may connect to one of the further network nodes. Upon receipt of a communication from the customer premises equipment, the further network node may query the controller to receive the customer policy data for serving the customer premises equipment.

In an example embodiment, the controller may include a database. The method 300 may further include maintaining, by the database, the customer policy data associated with the customer premises equipment, customer policy data associated with the plurality of customer premises equipment, and data provided by the customer to the web portal.

Figure 4:
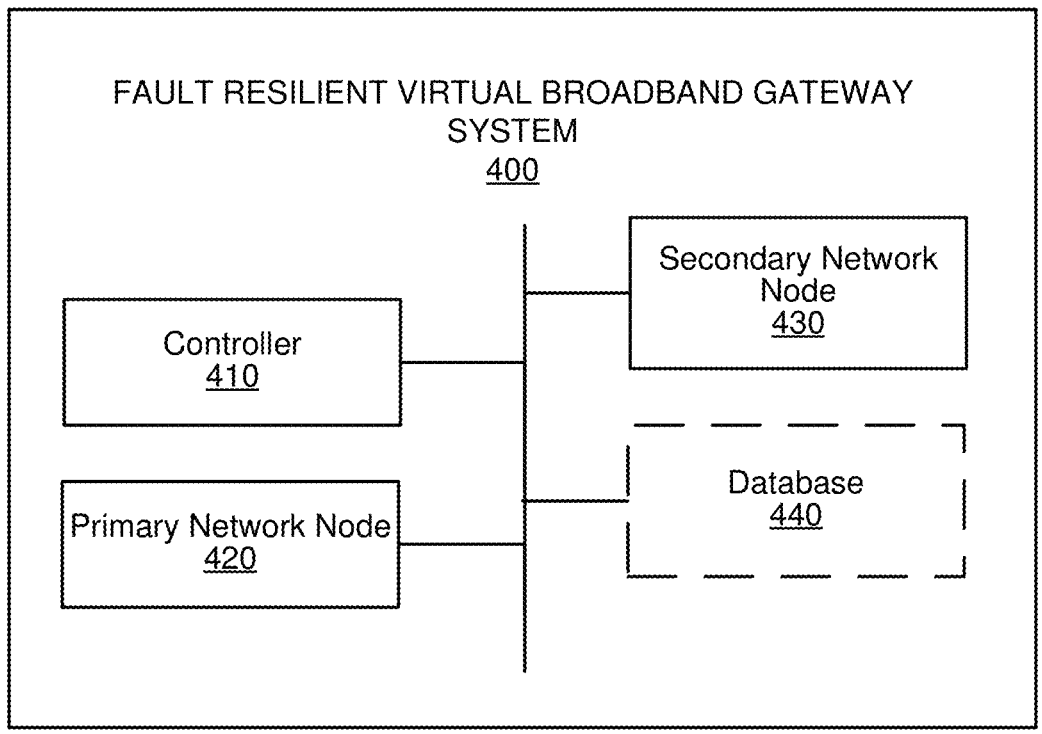
FIG. 4 is a block diagram illustrating various modules of a fault resilient virtual broadband gateway system.

FIG. 4 shows a block diagram illustrating various modules of a fault resilient virtual broadband gateway system 400, according to an example embodiment. Specifically, the system 400 may include a controller 410, a primary network node 420, a secondary network node 430, and optionally a database 440.

The controller 410 may be operable to continuously store customer policy data associated with customer premises equipment. In an example embodiment, the customer premises equipment may include at least one of the following: a modem, a router, a network switch, a wireless access point device, a gateway device, a network bridge, a hub, a repeater, and so forth. In a further example embodiment, the customer premises equipment may be connected to at least one customer device, such as a laptop, a smartphone, a smartwatch, a PC, a tablet computer, a television set, a set-top box, and the like.

The primary network node 420 may be operable to establish a first data traffic channel with the customer premises equipment. Upon establishment of the first data traffic channel, the primary network node 420 may collect the customer policy data associated with the customer premises equipment via the first data traffic channel. The customer policy data may be collected in a course of data communications between the primary network node 420 and the customer premises equipment. The primary network node 420 may be further operable to continuously provide the collected customer policy data to the controller 410. In an example embodiment, the customer policy data associated with the customer premises equipment may include at least one of the following: an IP address, a MAC address, configuration parameters associated with the customer premises equipment, configuration parameters associated with the at least one customer device connected to the customer premises equipment, a customer account, policies applied to the at least one customer device, a bandwidth associated with the at least one customer device, authorization data associated with the at least one customer device, privileges associated with the at least one customer device, passwords associated with the customer premises equipment, security information associated with the customer premises equipment, network settings associated with the customer premises equipment, and so forth.

In an example embodiment, the customer premises equipment may be preconfigured to determine presence of the primary network node 420 and the secondary network node 430 in a data network. The customer premises equipment may be further operable to determine that the primary network node 420 is unavailable. More specifically, in a course of data communications with the primary network node 420, the customer premises equipment may determine that the primary network node 420 does not respond to requests sent by the customer premises equipment. Based on the determination that the primary network node 420 is unavailable, the customer premises equipment may direct the data traffic associated with the customer premises equipment to the secondary network node 430.

Based on the receipt of the data traffic from the customer premises equipment, the secondary network node 430 may determine that the primary network node 420 is no longer available to serve the customer premises equipment. Based on the determination that the primary network node 420 is no longer available, the secondary network node 430 may establish a second data traffic channel with the customer premises equipment to receive the data communications. The secondary network node 430 may be further operable to receive, on demand, the customer policy data from the controller 410. Upon receipt of the customer policy data from the controller 410, the secondary network node 430 may serve the customer premises equipment via the second data traffic channel. More specifically, the secondary network node 430 may serve the customer premises equipment based on the customer policy data received from the controller 410. Therefore, when the primary network node 420 fails, continuous serving of the customer premises equipment is provided based on the customer policy data without any interruptions. Therefore, a seamless failover between the primary network node 420 and the at least one secondary network node 430 is provided.

In an example embodiment, the primary network node 420 and the secondary network node 430 may be associated with a web portal. The web portal may be accessible by a customer associated with the customer premises equipment to enable the customer to log into the customer account associated with the web portal to manage customer-specific data. The customer-specific data may include at least one of the following: the customer policy data associated with the customer premises equipment, configuration parameters associated with at least one customer device connected to the customer premises equipment, data associated with the customer account, and so forth. The data provided by the customer via the web portal may be collected by the controller 410.

In an example embodiment, the primary network node 420 and the secondary network node 430 may be operable to serve a plurality of customer premises equipment associated with a plurality of customers at a plurality of locations. More specifically, data traffic associated with the plurality of customers may be sent to the primary network node 420 or the secondary network node 430.

The database 440 may be in communication with the controller 410. The database may be operable to maintain the customer policy data associated with customer premises equipment, data provided by the customer via the web portal, and the like. In an example embodiment, the database 440 may be embedded into the controller 410.

Figure 5:
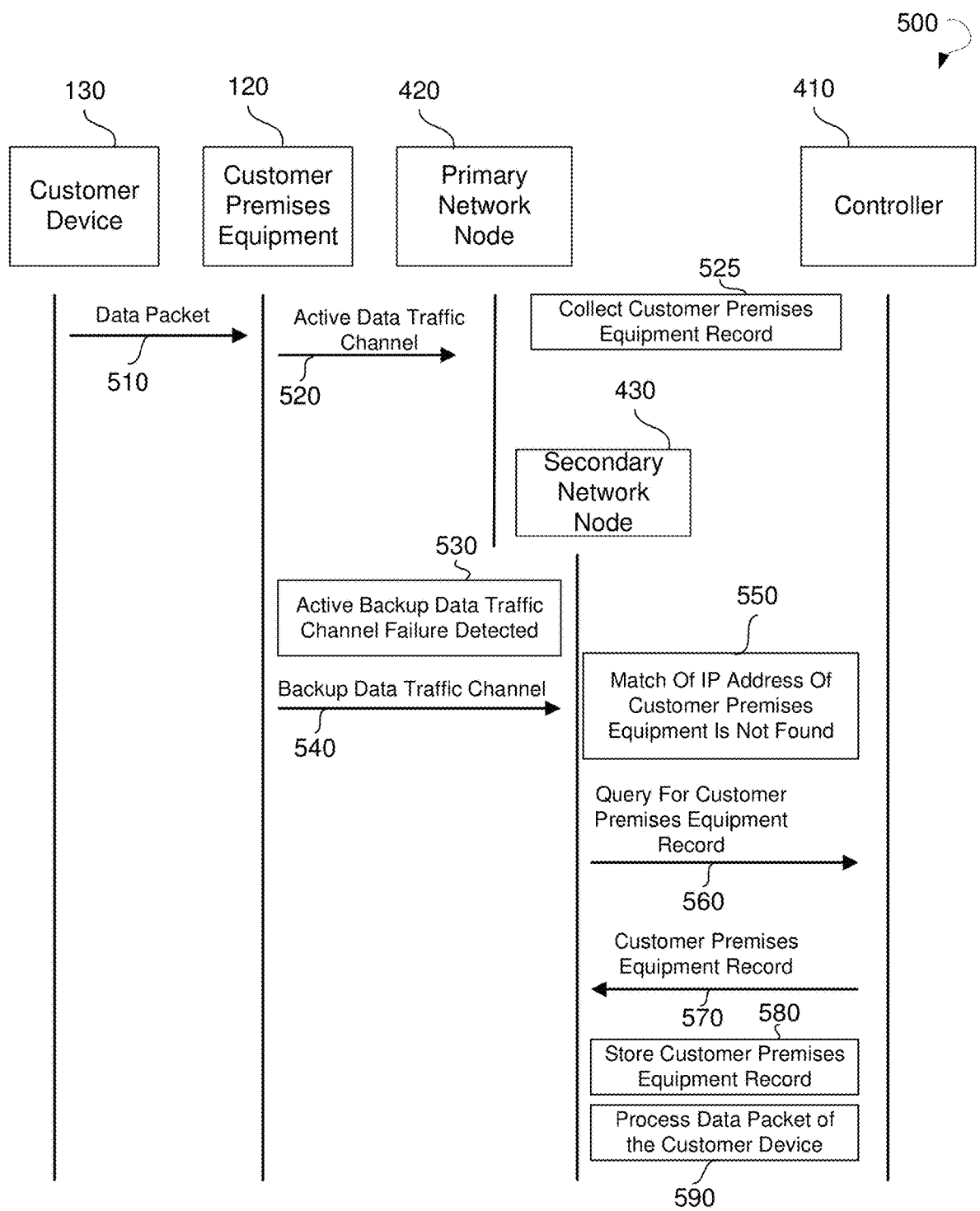
FIG. 5 is a schematic diagram illustrating providing a seamless failover between network nodes in case of a failure of one of the network nodes.

FIG. 5 is a diagram 500 illustrating providing a seamless failover between network nodes in case of a failure of one of the network nodes, according to an example embodiment. A customer device 130 may send a data packet 510 to customer premises equipment 120. In an example embodiment, the data packet 510 includes a request to establish a network session between the customer device 130 and a server (not shown). Upon receipt of the data packet 510 from the customer device 130, the customer premises equipment 120 may establish a first data traffic channel shown as an active data traffic channel 520 with a primary network node 420. Upon establishment of the active data traffic channel 520, the primary network node 420 may serve data traffic received from the customer premises equipment 120. At block 525, the primary network node 420 may further collect customer policy data of the customer premises equipment 120 and provide the collected customer policy data in a form of a customer premises equipment record to the controller 410 for storing.

In a course of the data communications with the primary network node 420, the customer premises equipment 120 may detect a failure of the active data traffic channel 520 at block 530. Upon detection of the failure, the customer premises equipment 120 may establish a second data traffic channel shown as a backup data traffic channel 540 with a secondary network node 430. When the backup data traffic channel 540 is established, the secondary network node 430 may determine, at block 550, whether a match of an IP address of the customer premises equipment 120 to IP addresses stored in the secondary network node 430 may be found. In other words, the secondary network node 430 checks whether the secondary network node 430 serves the customer premises equipment 120. At 560, if the match is not found, the secondary network node 430 queries the controller 410 to receive the customer premises equipment record. At 570, the controller 410 may provide the customer premises equipment record to the secondary network node 430. At block 580, the secondary network node 430 may store the received customer premises equipment record. Upon receipt of the customer premises equipment record, the secondary network node 430 may process the data packets associated with the customer device 130 based on the customer premises equipment record at block 590.

Figure 6:
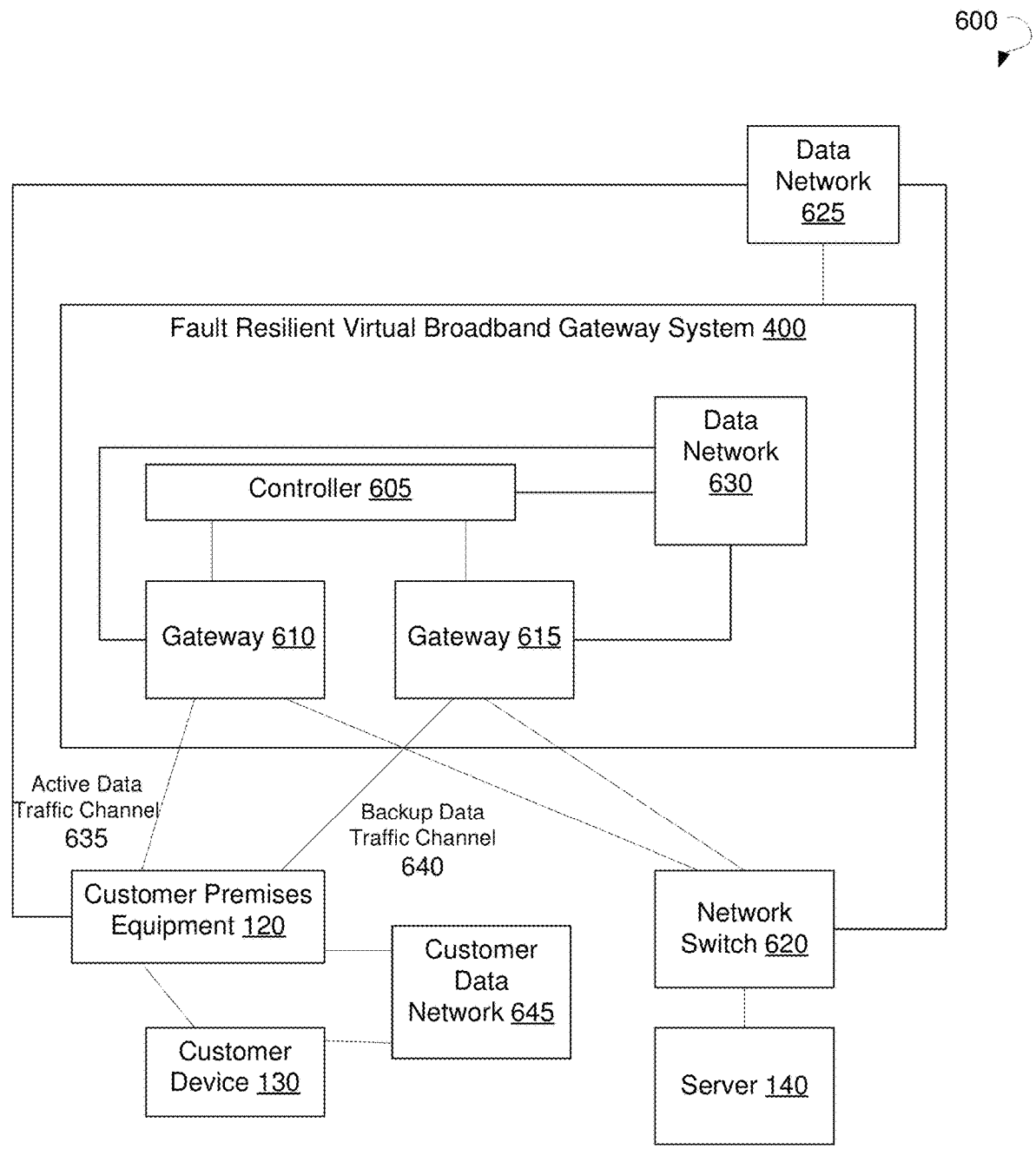
FIG. 6 is a block diagram illustrating providing a fault resilient virtual broadband gateway.

FIG. 6 is a block diagram 600 illustrating providing a fault resilient virtual broadband gateway, according to an example embodiment. A fault resilient virtual broadband gateway system 400 may include a virtual broadband gateway controller shown as a controller 605 and a plurality of virtual broadband gateways shown as a gateway 610 and a gateway 615. In an example embodiment, the gateway 610 and the gateway 615 are network nodes as described above with regard to FIGS. 2-5. Each of the gateway 610 and the gateway 615 may include a firewall, an Internet access gateway, a network switch, a network router, a home agent, a mobile broadband servicing node, a cable data network head end, and so forth. The controller 605 may include a computer server device, a network management system, a network switch, and so forth. In an example embodiment, the controller 605 may have fault tolerant server functionality.

The system 400 may provide data network access services to customer premises equipment 120. The customer premises equipment 120 may be connected to one or more customer devices shown as a customer device 130. In an example embodiment, the customer premises equipment 120 may include a consumer network device, such as a cable modem, a cable modem router, a digital subscriber line (DSL) modem, a DSL modem router, a cellular network modem, a cellular network modem router, a mobile hotspot router, a mobile broadband access modem or router, metro Ethernet customer premises equipment, carrier network access customer premises equipment, satellite network access customer premises equipment, customer premises equipment using an automated teller machine (ATM), Frame Relay, T1, T3, or Integrated Services Digital Network networking technologies.

The customer device 130 may include a customer network computing device, such as a PC, a laptop, a tablet, a smartphone, a printer, a voice over IP (VoIP) phone or phone system, a network switch, a network router, a wireless access point, a smart electronic device, a set top box, a network media player, an Internet radio or music player, a network digital picture frame, a smart television set, a smartwatch, a smart home appliance, a smart thermostat, a smart home appliance hub, a smart light bulb, a surveillance camera, an email server, a computing server, a network computing device, and so forth.

The system 400 may be configured to connect to a server 140 via a network switch 620 associated with the server 140. The network switch 620 may connect the system 400 to the Internet or a data center. In an example embodiment, the network switch 620 may be selected from an Ethernet switch, a router, a border gateway, an optical switch, a firewall, a broadband remote access system, and so forth.

In a further example embodiment, the server 140 may include a web server, a web application server, a mobile service server, an application delivery controller, a traffic manager, a server load balancer, a firewall, a remote access server, a VoIP system, a messaging system, a video server, a music server, a game server, a document server, a cloud storage server, a cloud application server, an Internet application server, and so forth.

The system 400, the customer premises equipment 120, and the network switch 620 of the server 140 may be connected via a data network 625. In an embodiment, the data network 625 may include an Ethernet network, an ATM network, a cellular network, a wireless network, a Frame Relay network, an optical network, an IP network or any data communication network utilizing other physical layers, link layer capability, or a network layer to carry data packets.

In a further example embodiment, the system 400 may include a data network 630 that may connect the controller 605, the gateway 610, and the gateway 615. The data network 630 may be a part of the data network 625. In a further example embodiment, the data network 630 may be a separate data network different from the data network 625. The data network 630 may include a system bus or dedicated cables inter-connecting nodes of the system 400. In one embodiment, the system 400 may include a physical chassis, and the controller 605 and the gateways 610, 615 may be physical cards within the physical chassis.

In an example embodiment, the system 400 may allow the customer premises equipment 120 to connect to the server 140 over the Internet via the network switch 620. The network switch 620 may be connected to the Internet in order to transmit data packets of the server 140.

In a further example embodiment, the customer premises equipment 120 and the customer device 130 may be connected via a customer data network 645. The customer data network 645 may reside on customer premises, such as a house, an apartment building, an office, a studio, a building, a retail store, a warehouse, a server room, a campus, or a customer facility. In an example embodiment, the customer data network 645 may include an Ethernet network, a LAN, a PAN, a wireless network, a data network utilizing wireless technologies such as Wi-Fi, 802.15.4, Bluetooth, Near Field Communication, or Ultra Sonic, a home network, an office data network, an Enterprise data network, a small business data network, and so forth.

The customer premises equipment 120 may connect to the system 400 via the gateway 610 or the gateway 615. More specifically, the customer premises equipment 120 may forward data packets of the customer device 130 to the gateway 610 of the system 400 using a data traffic channel. More specifically, the customer premises equipment 120 communicates with the gateway 610 using an active data traffic channel 635 to send the data packets of the customer device 130. In one embodiment, the active data traffic channel 635 may include a Generic Routing Encapsulation tunnel, a Layer 2 Tunnel Protocol tunnel, an IP-in-IP tunnel, a IPv4/v6 tunnel, a mobile IP tunnel, or other IP over IP tunnel protocols. Moreover, the active data traffic channel 635 may include a User Datagram Protocol (UDP)-based IP tunnel. In one embodiment, the customer premises equipment 120 sends data packets using the active data traffic channel 635 without establishing active data traffic channel 635 to the gateway 610 (i.e., in case when the active data traffic channel 635 was previously established by the customer premises equipment 120).

The gateway 610 may process data packets received over the active data traffic channel 635 and may send the processed data packets to the server 140. In an example embodiment, the gateway 610 may fail to service active data traffic channel 635. In case of the failure, the customer premises equipment 120 may send the data packets by establishing a backup data traffic channel 640 between the customer premises equipment 120 and the gateway 615. When the gateway 615 receives the data packets via the backup data traffic channel 640, the gateway 615 may process the received data packets and may transmit the processed data packets to the server 140.

As described, the system 400 may provide fault resilient virtual broadband gateway services to the customer premises equipment 120 and, thus, to the customer device 130, by allowing the customer premises equipment 120 to continue accessing the server 140 and/or the Internet despite the failure or service disruption of the active data traffic channel 635 or the gateway 610.

Figure 7:
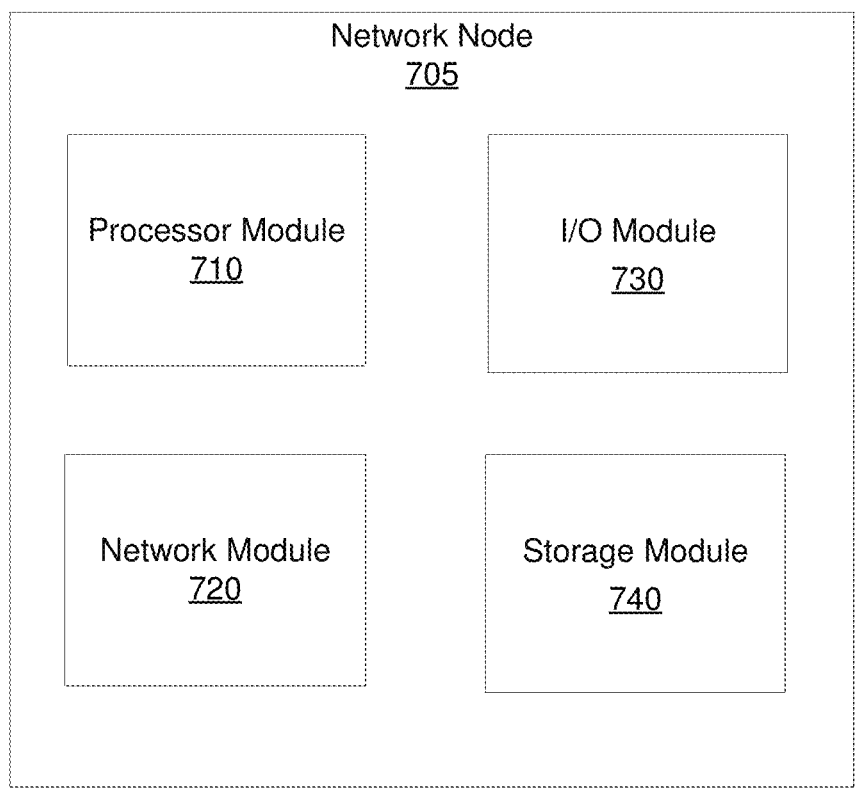
FIG. 7 is a block diagram illustrating a network node.

FIG. 7 is a block diagram 700 illustrating a network node, according to an example embodiment. A network node 705 may include a client device, a customer premises equipment, a controller, a gateway (i.e., a network node), a network switch, and a server. In an example embodiment, the network node 705 includes a processor module 710, a network module 720, an input/output (I/O) module 730, and a storage module 740. The processor module 710 may include one or more processors, such as a microprocessor, an Intel processor, an Advanced Micro Devices (AMD) processor, a microprocessor without interlocked pipeline stages, an advanced restricted instruction set computer (RISC) machine-based processor, or a RISC processor. In one embodiment, the processor module 710 may include one or more processor cores embedded in the processor module 710. In a further example embodiment, the processor module 710 may include one or more embedded processors, or embedded processing elements in a Field Programmable Gate Array, an Application Specific Integrated Circuit, or Digital Signal Processor. In an example embodiment, the network module 720 may include a network interface such as Ethernet, optical network interface, a wireless network interface, T1/T3 interface, a Wide Area Network (WAN) interface or a LAN interface. In a further example embodiment, the network module 720 may include a network processor. The storage module 740 may include Random-access memory (RAM), Dynamic Random Access Memory, Static Random Access Memory, Double Data Rate Synchronous Dynamic Random Access Memory, or memory utilized by the processor module 710 or the network module 720. The storage module 740 may store data utilized by the processor module 710. In an example embodiment, the storage module 740 may include a hard disk drive, a solid state drive, an external disk, a Digital Versatile Disc (DVD), a compact disk (CD), or a readable external disk. The storage module 740 may store one or more computer programming instructions, which when executed by the processor module 710 or the network module 720, implement one or more of the functionality of the methods and systems for providing a fault resilient virtual broadband gateway described herein. In an example embodiment, the I/O module 730 may include a keyboard, a keypad, a mouse, a gesture-based input sensor, a microphone, a physical or sensory input peripheral, a display, a speaker, or a physical or sensual output peripheral.

Figure 8:
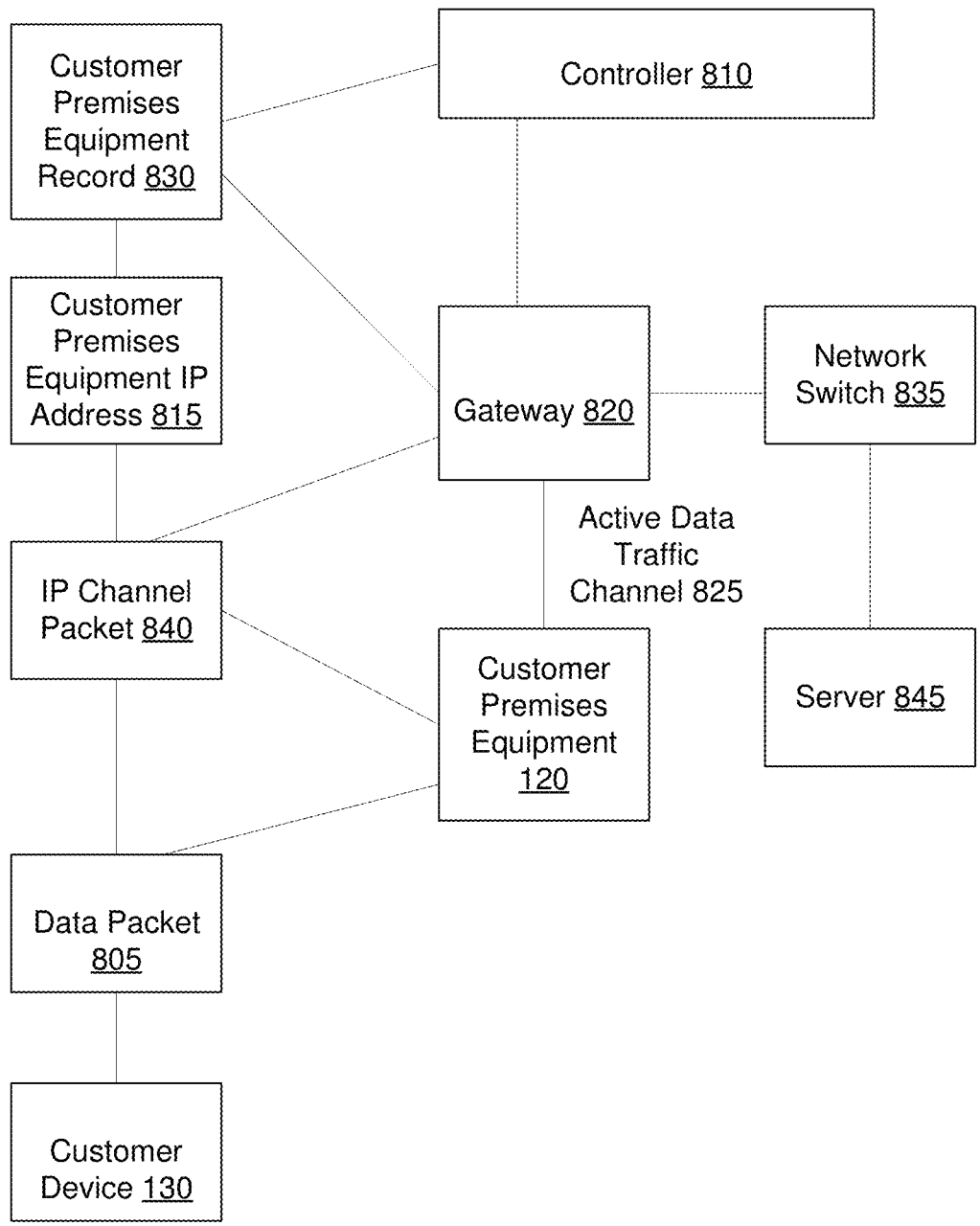
FIG. 8 is a block diagram illustrating a process of servicing customer premises equipment and customer devices using virtual broadband gateways.

FIG. 8 is a block diagram 800 illustrating a process of servicing customer premises equipment and customer devices using virtual broadband gateways, according to an example embodiment. In one embodiment, the customer premises equipment 120 receives a data packet 805 from a customer device 130. In an example embodiment, the data packet 805 may include an IP packet, a UDP/transmission control protocol (TCP) packet, a Session Initiation Protocol (SIP) packet, an Ethernet packet, a Virtual Local Area Network (VLAN) packet, a Wi-Fi packet, an Address Resolution Protocol/Reverse Address Resolution Protocol packet, a Dynamic Host Configuration Protocol (DHCP) packet, a Domain Name System (DNS) packet, a broadcast packet, a multicast packet, a layer 2 data packet, or a layer 3 data packet. The customer premises equipment 120 may generate an IP channel packet 840 and include the data packet 805 into the IP channel packet 840. In one embodiment, the customer premises equipment 120 places a customer premises equipment IP address 815 (also referred to an as IP address 815) associated with the customer premises equipment 120 into the IP channel packet 840. The IP address 815 may include networking information of the customer premises equipment 120, such as an IP address, a LAN address, a MAC address, a VLAN identity, a Service Set Identifier, an interface number, a wireless channel identity, and so forth.

The customer premises equipment 120 may send the IP channel packet 840 to a gateway 820 via an active data traffic channel 825. The gateway 820 may receive the IP channel packet 840 and retrieve the IP address 815 of the customer premises equipment 120. The gateway 820 may use the IP address 815 to retrieve a customer premises equipment record 830 from a controller 810. The gateway 820 may store the customer premises equipment record 830 in a computer storage module, as illustrated in FIG. 7. The customer premises equipment record 830 may include an IP address of the customer premises equipment 120. The gateway 820 may compare the IP address 815 retrieved from the IP channel packet 840 against the IP address of the customer premises equipment record 830 and determine whether there is a match. The gateway 820 may retrieve and use the customer premises equipment record 830 to process the IP channel packet 840.

In an example embodiment, the gateway 820 may receive the customer premises equipment record 830 from the controller 810 and match the IP address 815 against the customer premises equipment record 830.

In a further example embodiment, the controller 810 has the customer premises equipment record 830 pre-stored in a database of the controller 810. The controller 810 may be preconfigured with the customer premises equipment record 830.

In one embodiment, the gateway 820 may further process the IP channel packet 840 using the customer premises equipment record 830. The gateway 820 may obtain the data packet 805 from the IP channel packet 840. Based on the customer premises equipment record 830 and information from the data packet 805, the gateway 820 may determine that the data packet 805 is sent by the customer device 130. The gateway 820 may determine that the data packet 805 of the customer device 130 is intended for a server 845. The gateway 820 may process the data packet 805, optionally modify the data packet 805, and send the processed data packet 805 to the network switch 835. The network switch 835 may send the processed data packet 805 to the server 845. The processing of the data packet 805 by the gateway 820 may include one or more of the following: network address translation processing, deep packet inspection processing, access control processing, traffic management, security inspection, TCP proxy processing, HyperText Transfer Protocol proxy processing, secure sockets layer intercept processing, legal intercept processing, firewall processing, rate control processing, or other usual broadband gateway service processing.

In an example embodiment, the data packet 805 from the customer device 130 may not require transmission to the server 845. The gateway 820 may process the data packet 805 accordingly. Appropriate processing for the data packet 805 may include one or more of the following: DHCP processing, IP address management processing, packet broadcasting processing, address resolution processing, DNS processing, layer 2 packet processing, virtual broadband service management processing, virtual broadband service administration or configuration processing, virtual broadband access control configuration processing, customer service application processing, or other virtual broadband gateway application service processing. In a further example embodiment, the gateway 820 may process the data packet 805 and determine to discard the data packet 805.

Figure 9:
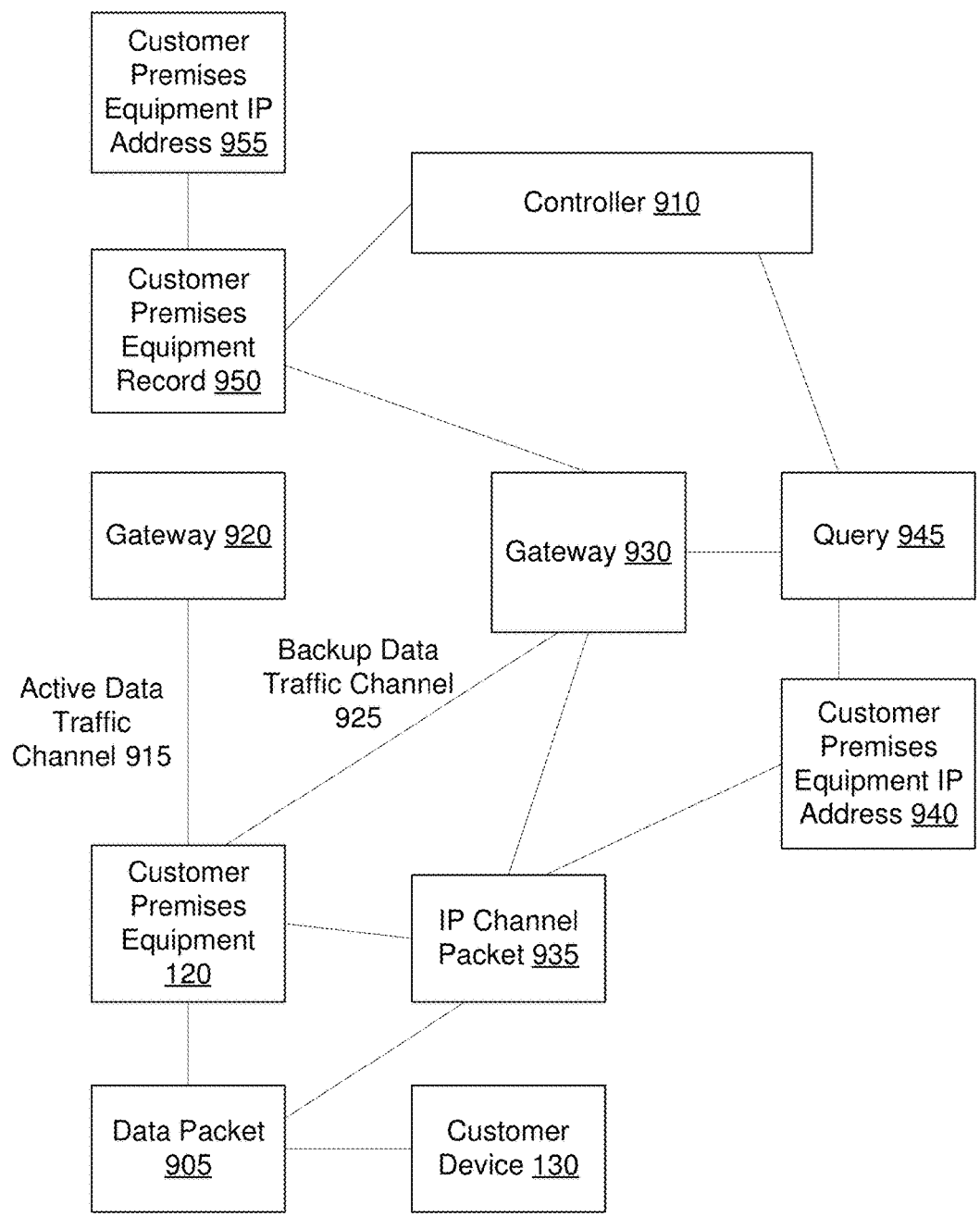
FIG. 9 is a block diagram illustrating a failover provided by a fault resilient virtual broadband gateway system.

FIG. 9 is a block diagram 900 illustrating a failover provided by a fault resilient virtual broadband gateway system, according to an example embodiment. Customer premises equipment 120 may have an active data traffic channel 915 with a gateway 920. The customer premises equipment 120 may choose to use a backup data traffic channel 925 with a gateway 930. The customer premises equipment 120 may determine that the active data traffic channel 915 is no longer available. In an example embodiment, the gateway 920 may inform the customer premises equipment 120 over the active data traffic channel 915 that the active data traffic channel 915 is no longer available. In a further example embodiment, the customer premises equipment 120 may detect lack of activity over the active data traffic channel 915. In a further example embodiment, the customer premises equipment 120 may determine that the gateway 920 has not responded to a data packet sent earlier over the active data traffic channel 915. The customer premises equipment 120 may detect a failure of a network interface or a hardware component affecting the active data traffic channel 915.

Upon determining that the active data traffic channel 915 is no longer available or usable, the customer premises equipment 120 may use a backup data traffic channel 925. More specifically, the customer premises equipment 120 may establish the backup data traffic channel 925 with the gateway 930. In an example embodiment, the backup data traffic channel 925 can be previously established before determination of failure of the active data traffic channel 915. When the customer premises equipment 120 receives a data packet 905 from customer device 130, the customer premises equipment 120 generates an IP channel packet 935 using the data packet 905 and transmits the IP channel packet 935 to the gateway 930 via the backup data traffic channel 925. The customer premises equipment 120 adds a customer premises equipment IP address 940 (also referred to as an IP address 940) associated with the customer premises equipment 120 into the IP channel packet 935.

The gateway 930 receives the IP channel packet 935 and retrieves the IP address 940 from the IP channel packet 935. The gateway 930 matches the retrieved IP address 940 to customer premises equipment records stored at the gateway 930 so as to select a matching customer premises equipment record. The gateway 930 may determine that there is no matching customer premises equipment record. The gateway 930 sends a query 945 to a controller 910. The gateway 930 adds the IP address 940 to the query 945. The controller 910 matches the IP address 940 obtained from the query 945 against an IP address 955 of a customer premises equipment record 950 stored in the controller 910 and determines that the customer premises equipment record 950 matches the IP address 940 of the query 945. The controller 910 sends the customer premises equipment record 950 to the gateway 930. The controller 910 may send the customer premises equipment record 950 as a response to the query 945. The controller 910 may send the customer premises equipment record 950 to the gateway 930 upon processing a plurality of queries from the gateway 930.

Upon receiving the customer premises equipment record 950 from the controller 910, the gateway 930 may process the IP channel packet 935 and the data packet 905 using the customer premises equipment record 950 according to a broadband gateway application service indicated or required by the data packet 905, as described in FIG. 8. In an example embodiment, the data packet 905 may require network address translation and the gateway 930 may not find a matching IP session corresponding to the data packet 905. The gateway 930 may discard the data packet 905.

In a further example embodiment, the gateway 930 may match the IP address 940 to the customer premises equipment record 950, which may be previously stored in the gateway 930. The gateway 930 may process IP channel packet 935 and the data packet 905 using the customer premises equipment record 950 according to a broadband gateway application service indicated or required by the data packet 905, as described with reference to FIG. 8. In an example embodiment, the data packet 905 may require network address translation, and the gateway 930 may not find a matching IP session corresponding to the data packet 905. The gateway 930 may discard the data packet 905. In a further example embodiment, the gateway 930 may find a matching IP session corresponding to the data packet 905. The IP session may include a TCP session, a UDP session, a SIP session, a VPN session, and the like. The gateway 930 may apply the appropriate steps of network address translation to the data packet 905.

In an example embodiment, the customer premises equipment 120 may switch from using the active data traffic channel 915 to using the backup data traffic channel 925. The customer premises equipment 120 may indicate the backup data traffic channel 925 as active and indicate the active data traffic channel 915 to the gateway 920 as backup. Later, the customer premises equipment 120 may determine that the backup data traffic channel 925 is unavailable and fails over to the active data traffic channel 915 with the gateway 920. In an example embodiment, the customer premises equipment 120 may determine that the active data traffic channel 915 is available again and may switch from using the backup data traffic channel 925 to using the active data traffic channel 915 without determining the backup data traffic channel 925 being unavailable.

In an example embodiment, the controller 910 may send a message to the gateway 920 to remove the customer premises equipment record 950 from the gateway 920. The controller 910 may add an indication into the customer premises equipment record 950 indicating which gateway has a current customer premises equipment record 950. The gateway 920 may query the controller 910 if its customer premises equipment record 950 is a current customer equipment premises record, and may remove its customer premises equipment record 950 if it is not the current customer premises record.

Figure 10:
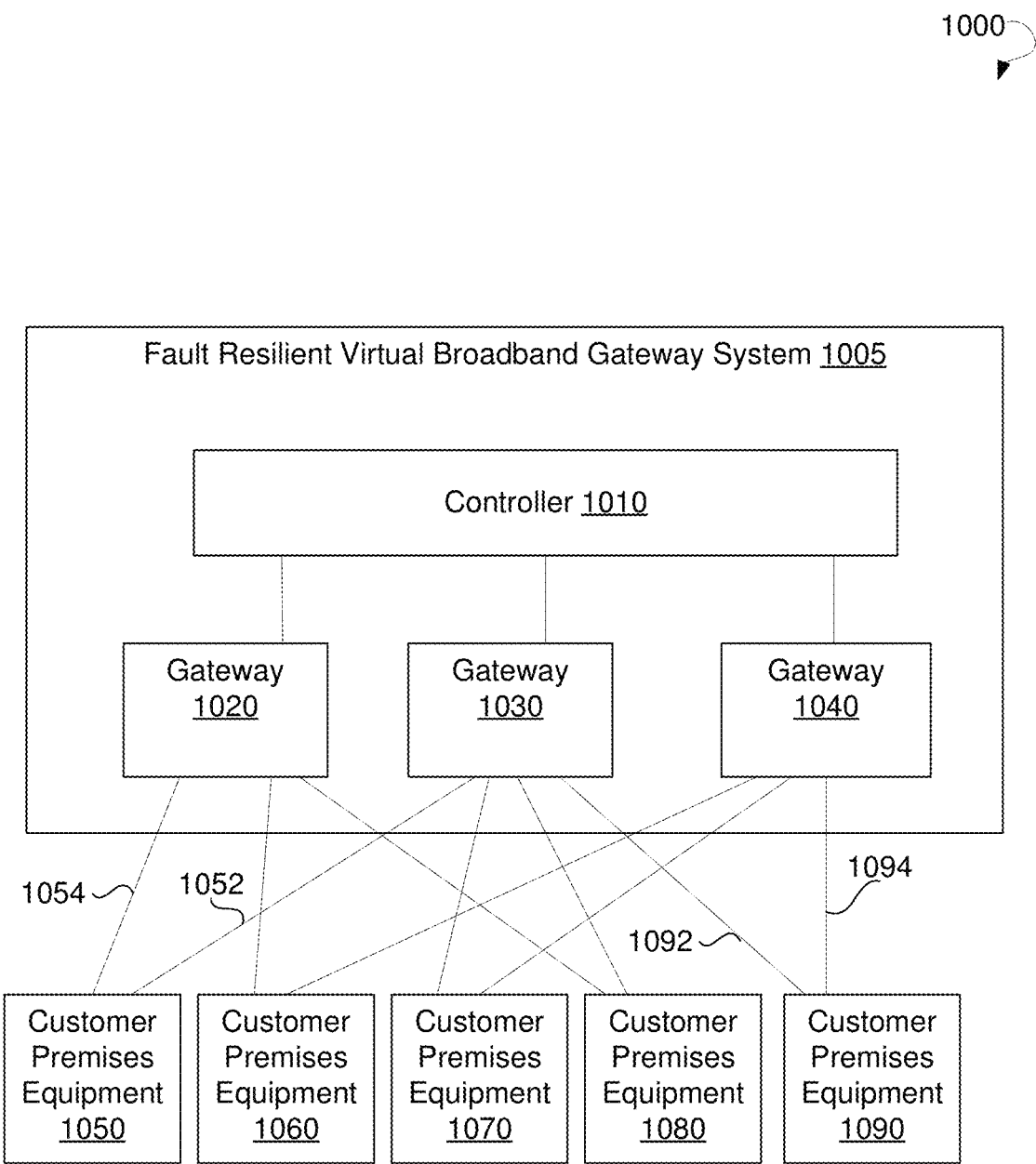
FIG. 10 is a schematic diagram showing servicing a plurality of customer premises equipment by a many-to-one fault resilient virtual broadband gateway system.

FIG. 8 and FIG. 9 describe a one-to-one fault resilient virtual broadband gateway system for serving customer premises equipment. When there are a plurality of customer premises equipment, a many-to-one fault resilient virtual broadband gateway system may be used for serving the plurality of customer premises equipment, as illustrated in FIG. 10. FIG. 10 is a schematic diagram 1000 showing serving a plurality of customer premises equipment by a many-to-one fault resilient virtual broadband gateway system In this embodiment, a plurality of customer premises equipment shown as customer premises equipment 1050, 1060, 1070, 1080, and 1090 is connected to a fault resilient virtual broadband gateway system 1005. The fault resilient virtual broadband gateway system 1005 has a controller 1010 and a plurality of gateways shown as a gateway 1020, 1030, and 1040. Each of the customer premises equipment is connected to two virtual broadband gateways. For example, the customer premises equipment 1050 is connected to the gateway 1020 and the gateway 1030.

In an example embodiment, the gateway 1030 fails or becomes unavailable. The customer premises equipment 1050, 1070, 1080, and 1090 are connected to the gateway 1030 and the customer premises equipment 1050 and 1090 have active data traffic channels with the gateway 1030. The customer premises equipment 1050 switches from an active data traffic channel 1052 to a backup data traffic channel 1054 with the gateway 1020. The customer premises equipment 1090 switches from an active data traffic channel 1092 to a backup data traffic channel 1094 with the gateway 1040.

As illustrated in FIG. 10, the fault resilient virtual broadband gateway system 1005 includes two or more gateways that serve a plurality of customer premises equipment. Failure of one gateway in the fault resilient virtual broadband gateway system 1005 still allows providing a continuous service to the plurality of customer premises equipment, thus offering a many-to-one fault resilient virtual broadband gateway service.

Figure 11:
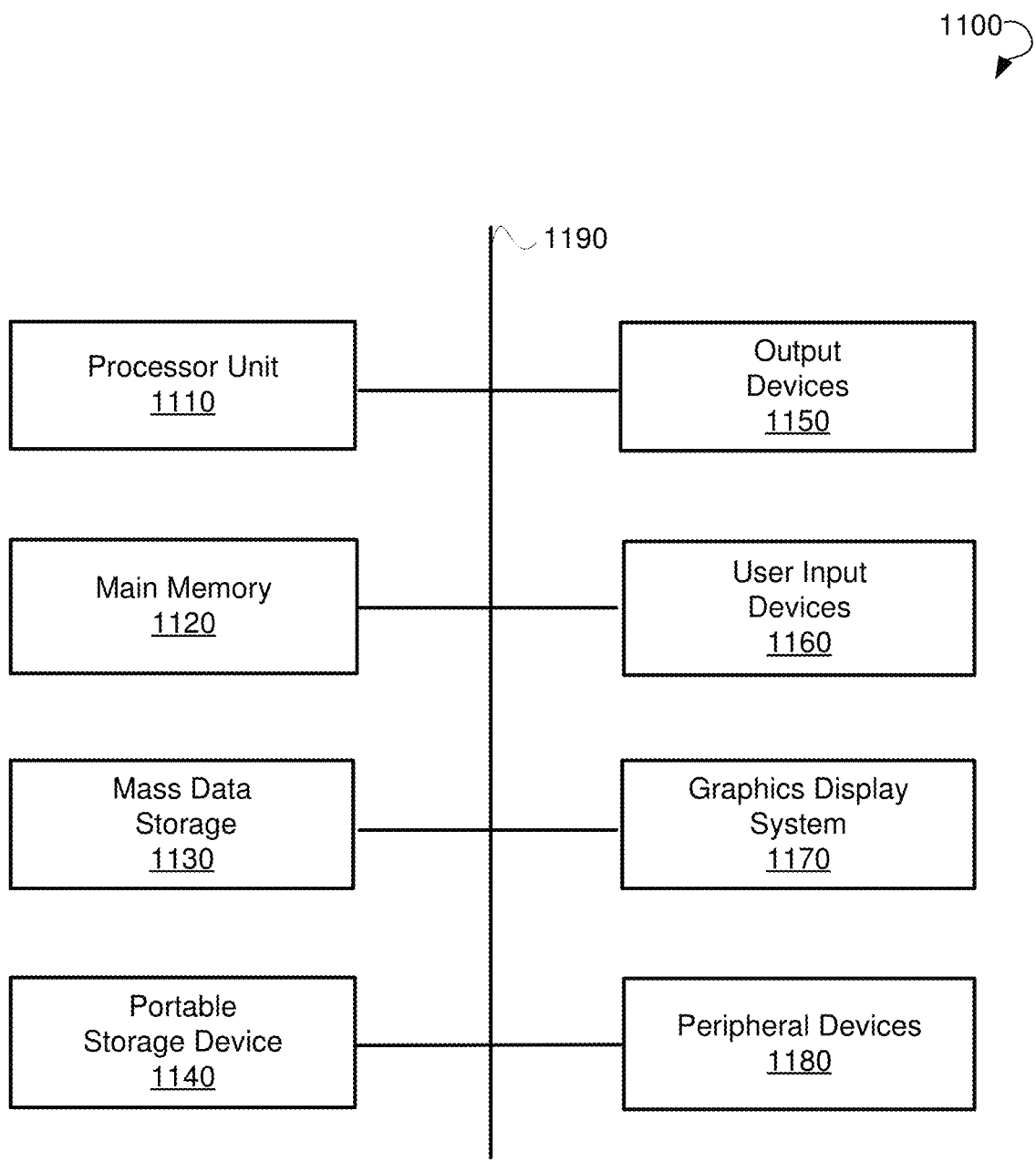
FIG. 11 shows a diagrammatic representation of a computing device for a machine, within which a set of instructions for causing the machine to perform any one or more of the methodologies discussed herein can be executed.

FIG. 11 illustrates a computer system 1100 that may be used to implement embodiments of the present disclosure, according to an example embodiment. The computer system 1100 may serve as a computing device for a machine, within which a set of instructions for causing the machine to perform any one or more of the methodologies discussed herein can be executed. The computer system 1100 can be implemented in the contexts of the likes of computing systems, networks, servers, or combinations thereof. The computer system 1100 includes one or more processor units 1110 and main memory 1120. Main memory 1120 stores, in part, instructions and data for execution by processor units 1110. Main memory 1120 stores the executable code when in operation. The computer system 1100 further includes a mass data storage 1130, a portable storage device 1140, output devices 1150, user input devices 1160, a graphics display system 1170, and peripheral devices 1180. The methods may be implemented in software that is cloud-based.

The components shown in FIG. 11 are depicted as being connected via a single bus 1190. The components may be connected through one or more data transport means. Processor units 1110 and main memory 1120 are connected via a local microprocessor bus, and mass data storage 1130, peripheral devices 1180, the portable storage device 1140, and graphics display system 1170 are connected via one or more I/O buses.

Mass data storage 1130, which can be implemented with a magnetic disk drive, solid state drive, or an optical disk drive, is a non-volatile storage device for storing data and instructions for use by processor units 1110. Mass data storage 1130 stores the system software for implementing embodiments of the present disclosure for purposes of loading that software into main memory 1120.

The portable storage device 1140 operates in conjunction with a portable non-volatile storage medium, such as a floppy disk, a CD, a DVD, or USB storage device, to input and output data and code to and from the computer system 1100. The system software for implementing embodiments of the present disclosure is stored on such a portable medium and input to the computer system 1100 via the portable storage device 1140.

User input devices 1160 provide a portion of a user interface. User input devices 1160 include one or more microphones; an alphanumeric keypad, such as a keyboard, for inputting alphanumeric and other information; or a pointing device, such as a mouse, a trackball, stylus, or cursor direction keys. User input devices 1160 can also include a touchscreen. Additionally, the computer system 1100 includes output devices 1150. Suitable output devices include speakers, printers, network interfaces, and monitors.

Graphics display system 1170 includes a liquid crystal display or other suitable display device. Graphics display system 1170 receives textual and graphical information and processes the information for output to the display device. Peripheral devices 1180 may include any type of computer support device to add additional functionality to the computer system.

The components provided in the computer system 1100 of FIG. 11 are those typically found in computer systems that may be suitable for use with embodiments of the present disclosure and are intended to represent a broad category of such computer components that are well known in the art. Thus, the computer system 1100 can be a PC, handheld computing system, telephone, mobile computing system, workstation, tablet, phablet, mobile phone, server, minicomputer, mainframe computer, or any other computing system. The computer may also include different bus configurations, networked platforms, multi-processor platforms, and the like. Various operating systems may be used including UNIX, LINUX, WINDOWS, MAC OS, PALM OS, ANDROID, IOS, QNX, and other suitable operating systems.

It is noteworthy that any hardware platform suitable for performing the processing described herein is suitable for use with the embodiments provided herein. Computer-readable storage media refer to any medium or media that participate in providing instructions to a central processing unit, a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a Compact Disk Read Only Memory disk, DVD, Blu-ray disc, any other optical storage medium, RAM, Programmable Read-Only Memory, Erasable Programmable Read-Only Memory, Electronically Erasable Programmable Read-Only Memory, flash memory, and/or any other memory chip, module, or cartridge.

In some embodiments, the computer system 1100 may be implemented as a cloud-based computing environment, such as a virtual machine operating within a computing cloud. In other embodiments, the computer system 1100 may itself include a cloud-based computing environment, where the functionalities of the computer system 1100 are executed in a distributed fashion. Thus, the computer system 1100, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 1100, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

Thus, methods and systems for providing a fault resilient virtual broadband gateway have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for providing a fault resilient virtual broadband gateway, the method comprising:
    establishing, by a primary network node, a first data traffic channel with a customer networking device, the customer networking device located at customer premises;
    collecting, by the primary network node, in a course of data communications with the customer networking device, the customer networking device located at the customer premises, via the first data traffic channel, customer policy data associated with the customer networking device;
    providing, by the primary network node, at a time of the data communications between the primary network node and the customer networking device, the collected customer policy data to a controller, wherein the controller collects, from a plurality of network nodes, customer policy data associated with data communications between the plurality of network nodes and a plurality of customer networking devices located at the customer premises;
    establishing, by the at least one secondary network node of the plurality of network nodes, a second data traffic channel with the customer networking device for receiving the data communications between the customer networking device and the at least one secondary network node, the customer networking device being aware of a network address of each of the plurality of network nodes, the customer networking device selecting the at least one secondary network node to serve the data communications when the primary network node is no longer available, the customer networking device sending the data communications via the second data traffic channel to the at least one secondary network node based on the network address of the at least one secondary network node and upon determining that the primary network node is no longer available;
    determining, by the at least one secondary network node, that the primary network node is no longer available to serve the customer networking device;
    based on the determination, indicating, by the at least one secondary network node, the establishing of the second data traffic channel with the customer networking device for receiving the data communications;
    upon the establishing of the second data traffic channel, determining, by the at least one secondary network node, that a network address associated with the customer networking device matches one of customer premises equipment records pre-stored on the at least one secondary network node;
    upon the determining that the primary network node is no longer available and the establishing of the second data traffic channel, receiving, on demand, by the at least one secondary network node, the customer policy data from the controller; and
    serving, by the at least one secondary network node, via the second data traffic channel, the customer networking device based on the customer policy data and information present in the one of customer premises equipment records, thereby providing a seamless failover between the primary network node and the at least one secondary network node.

2. The method of claim 1, wherein the customer networking device is connected to at least one customer device, the at least one customer device including at least one of the following: a laptop, a smartphone, a smartwatch, a personal computer, a tablet computer, a television set, and a set-top box.

3. The method of claim 2, wherein the customer policy data associated with the customer networking device includes at least one of the following: an Internet Protocol (IP) address, a Media Access Control (MAC) address, configuration parameters associated with the customer networking device, configuration parameters associated with the at least one customer device connected to the customer networking device, a customer account, policies applied to the at least one customer device, a bandwidth associated with the at least one customer device, authorization data associated with the at least one customer device, privileges associated with the at least one customer device, passwords associated with the customer networking device, security information associated with the customer networking device, and network settings associated with the customer networking device.

4. The method of claim 3, wherein each of the primary network node and the at least one secondary network node is associated with a web portal, the web portal being accessible by the customer associated with the customer networking device to enable the customer to log into the customer account associated with the web portal to manage at least one of the following: the customer policy data associated with the customer networking device, configuration parameters associated with at least one customer device connected to the customer networking device, and the customer account.

5. The method of claim 4, wherein the controller is configured to collect data provided by the customer via the web portal.

6. The method of claim 1, wherein the primary network node and the at least one secondary network node are operable to serve a plurality of customer networking devices associated with a plurality of customers at a plurality of locations.

7. The method of claim 6, further comprising maintaining, by a database, the customer policy data associated with the customer networking device and customer policy data associated with the plurality of customer networking devices, the database being in communication with the controller.

8. The method of claim 1, wherein the customer networking device includes at least one of the following: a modem, a router, a network switch, a wireless access point device, a gateway device, a network bridge, a hub, and a repeater.

9. The method of claim 1, wherein the customer networking device is preconfigured to determine presence of the primary network node and the at least one secondary network node in a data network.

10. The method of claim 1, wherein the customer networking device is preconfigured to:
- determine that the primary network node is unavailable; and
- based on the determination, direct a data traffic associated with the customer networking device to the at least one secondary network node.

11. A fault resilient virtual broadband gateway system, the system comprising:
- a controller operable to:
  - collect, from a plurality of network nodes, customer policy data associated data communications between a plurality of network nodes and a plurality of customer networking devices located at customer premises; and
  - store the customer policy data;
- a primary network node operable to:
  - establish a first data traffic channel associated with a customer networking device located at the customer premises;
  - collect, in a course of data communications with the customer networking device, via the first data traffic channel, customer policy data associated with the customer networking device; and
  - provide, at a time of the data communications between the primary network node and the customer networking device, the collected customer policy data to the controller; and
- the at least one secondary network node operable to:
  - establish a second data traffic channel with the customer networking device for receiving the data communications between the customer networking device and the at least one secondary network node, the customer networking device being aware of a network address of each of the plurality of network nodes, the customer networking device selecting the at least one secondary network node to serve the data communications when the primary network node is no longer available, the customer networking device sending the data communications via the second data traffic channel to the at least one secondary network node based on the network address of the at least one secondary network node and upon determining that the primary network node is no longer available;
  - determine that the primary network node is no longer available to serve the customer networking device;
  - based on the determination, indicate the establishing of the second data traffic channel associated with customer networking device for receiving the data communications;
  - upon the establishing of the second data traffic channel, determine that a network address associated with the customer networking device matches one of customer premises equipment records pre-stored on the at least one secondary network node;
  - upon the determining that the primary network node is no longer available and the establishing of the second data traffic channel, receive, on demand, the customer policy data from the controller; and
  - serve, via the second data traffic channel, the customer networking device based on the customer policy data and information present in the one of customer premises equipment records, thereby providing a seamless failover between the primary network node and the at least one secondary network node;
- wherein the primary network node and the at least one secondary network node are configured to serve the plurality of customer networking devices located at the customer premises and associated with a plurality of customers at a plurality of locations; and
- a database in communication with the controller to maintain the customer policy data associated with the customer networking device and the customer policy data associated with the plurality of customer networking devices;
- wherein each of the primary network node and the at least one secondary network node is associated with a web portal, the web portal being accessible by a customer associated with the customer networking device to enable the customer to log into a customer account associated with the web portal to manage at least one of the following: the customer policy data associated with the customer networking device, configuration parameters associated with at least one customer device connected to the customer networking device, and the customer account; and
- wherein the controller is configured to collect data provided by the customer via the web portal.

* * * * *